UNITED STATES PATENT OFFICE 2,214,931

CERAMIC BODY FOR SPARK PLUG INSULATORS

Taine G. McDougal, Albra H. Fessler and Helen Blair Barlett, Flint, Mich., assignors to General Motors Corporation, Detroit, Mich., a corporation of Delaware No Drawing. Application September 7, 1938, Serial No. 228,821

2 Claims. (Cl. 106—12)

This is a continuation in part of our prior application Serial No. 50,243 filed November 16, 1935.

This invention has to do with ceramic bodies especially adapted for use as spark plug insulators. We have found that compositions consisting principally of aluminum oxide and monazite sand—a mixture of rare earths including substantial proportions of cerium phosphate and thoria—when finely ground, shaped into bodies and sintered at high temperatures, are converted into a non-porous ceramic product of such dense and compact structure as to result in an improvement in certain desirable physical characteristics, such as thermal efficiency, mechanical strength, electrical resistance at elevated temperatures, and resistance to thermal shock. When alumina recrystallizes it has a tendency to contain gas vesicles or blebs, even though it has been completely melted and allowed to crystallize from the molten state, especially in the center of the individual crystals. The lower the temperature at which this recrystallization takes place, the greater the number of vesicles. Normally, corundum crystals are nearly opaque as a result of this condition. The physical properties of completely clear crystals vary rather widely from those of the highly vesicular crystals which contain an appreciable volume of voids. We have found it possible to reduce these vesicles and to obtain homogeneous crystals by the addition of monazite sand to alumina. Further, the addition of this material induces formation of this denser and more compact structure at greatly reduced temperatures, which is economically highly desirable.

Spark plug insulators of the compositions herein disclosed are characterized by unusually high thermal efficiency. In testing spark plugs for thermal efficiency, they are run in engines operating at high speed and under heavy load and the efficiency of the insulator is determined by the period over which the motor continues to develop full power output. In physical effect this is a measurement of the ability of the insulator composition to carry off heat under actual engine operating conditions. With respect to thermal efficiency, alumina bodies containing small percentages of monazite sand, e. g., on the order of from .5% to 3% are markedly superior to bodies made entirely of aluminum oxide. Even in the case of larger additions of monazite sand up to in the neighborhood of 20% thermal efficiency is greatly superior to that of the best porcelain bodies now available.

The new bodies are likewise far superior to the best porcelain insulators now available with respect to their resistance to heat shock, that is, to the effects of sudden temperature changes. They are also comparable in this quality to the best all-alumina insulators. The new bodies are likewise very satisfactory in respect to the other qualities essential in spark plug insulators, such as electrical resistance at high temperatures and mechanical strength.

Where the higher percentages of monazite sand are used the firing temperature is much reduced. For example, with the 20% monazite sand, bodies may be satisfactorily fired at Orton cone 20, which is about 1530° C. This lower temperature makes the firing less difficult and less costly.

Bodies most suited for use as spark plug insulators have been made with from .5% to 20% monazite sand.

A further practical advantage of the new composition lies in the fact that, like alumina, monazite sand of high purity and uniform quality is readily obtainable on the market.

The improved insulators are manufactured by first grinding and thoroughly mixing the ingredients. The grinding is preferably carried to a point where all of the material is in the form of a fine powder capable of passing through screens of 325 mesh to the linear inch. The ingredients should be substantially free from alkali because of the deleterious effect of the latter on the electrical properties of the insulator. The insulators may be molded into shape with the aid of a suitable binding agent by the process described and claimed in Patent No. 2,122,960 granted to Karl Schwartzwalder on July 5, 1938; by pressing in rubber molds as described in Patent No. 2,091,973 granted to Albra H. Fessler and Ralston Russel, Jr. on September 7, 1937; by casting, or by any other of the known methods used in forming bodies from non-plastic materials. The first mentioned method has been found to be preferable because the resulting insulator usually possesses a smooth, glossy surface requiring no glaze.

The formed bodies are then fired to a suitable temperature to produce recrystallization, and this is usually accompanied by considerable shrinkage. The firing time and temperature must be controlled as in usual kiln practice so as to secure complete recrystallization and to avoid over-firing with resultant warpage or other injury to the product. Firing temperatures of from Orton cone 20 to cone 35 (1530° C. to 1830° C.) will be found satisfactory, the exact temperature depending upon the composition of the body as previously pointed out.

It may also provide desirable to combine with the alumina not only proportions of monazite sand but also proportions of inorganic compounds forming solid solutions with alumina as described and claimed in the copending applications of Taine G. McDougal, Albra H. Fessler and Karl Schwartzwalder, Serial Nos. 134,124 and 134,125, filed March 31, 1937, and/or proportions of inorganic materials forming compounds with alumina as described and claimed in Patent No. 2,120,338 granted to Taine G. McDougal, Albra H. Fessler and Karl Schwartzwalder on June 14, 1938. Small proportions, for example up to 5%, of suitable fluxes such as talc or fluorspar, may be added to the compositions herein disclosed to further reduce the firing temperatures.

We claim:

1. A spark plug insulator characterized by high thermal efficiency, superior resistance to heat shock, good mechanical strength and high electrical resistance at both high and low temperatures, in the form of a dense, non-porous body consisting of a sintered mixture of corundum and from .5% to 20% monazite sand.

2. A spark plug insulator characterized by high thermal efficiency, superior resistance to heat shock, good mechanical strength and high electrical resistance at both high and low temperatures, in the form of a dense, non-porous body consisting of a sintered mixture of corundum and from .5% to 3% monazite sand.

TAINE G. McDOUGAL.
ALBRA H. FESSLER.
HELEN BLAIR BARLETT.